No. 833,733. PATENTED OCT. 23, 1906.
W. W. DEAN.
TELEPHONE SYSTEM.
APPLICATION FILED DEC. 23, 1902.
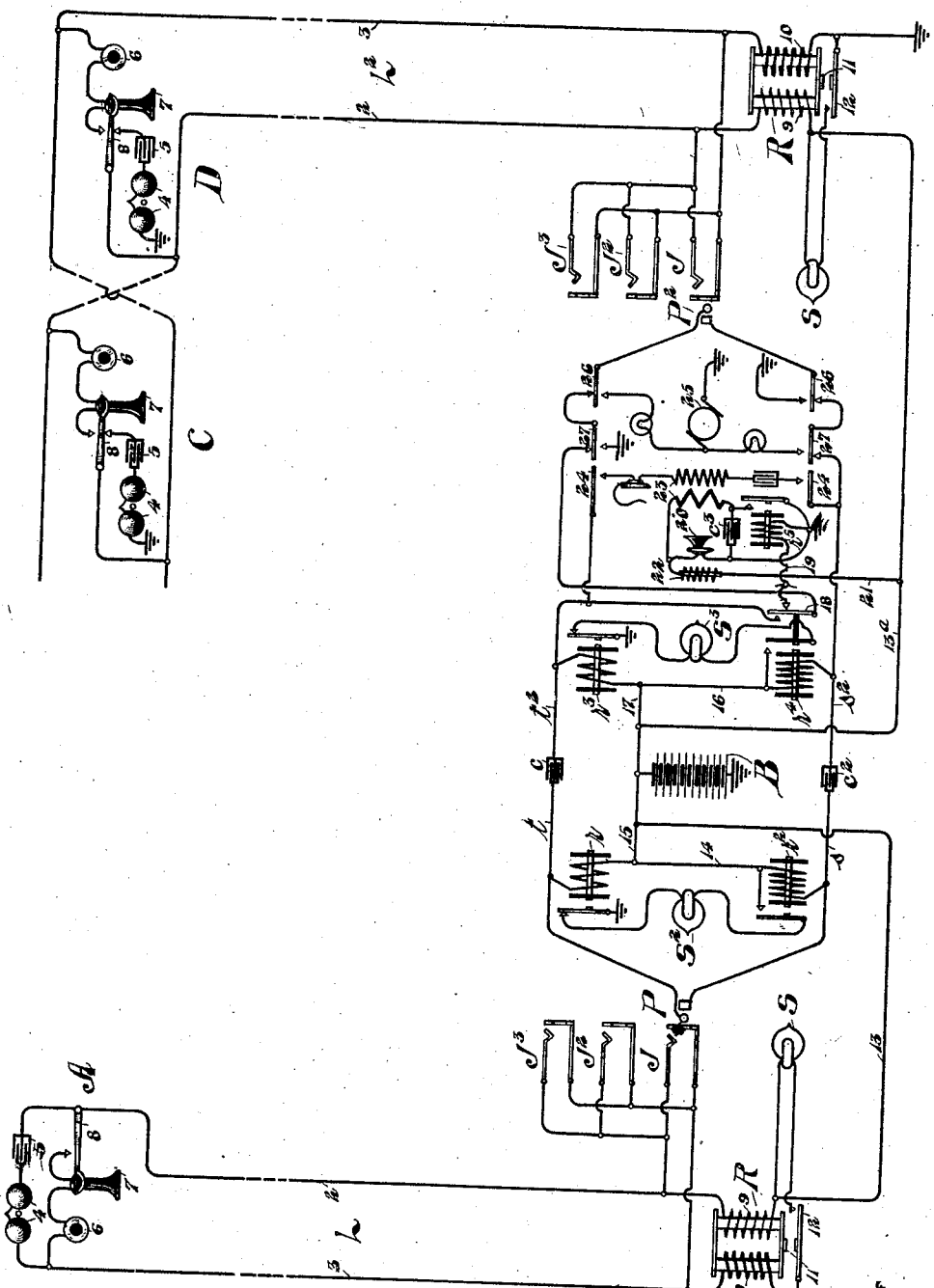
Witnesses.
R. H. Binford
Gazelle Beder
Inventor:-
William W. Dean,
by Robert Lewis Ames,
Attorney.

UNITED STATES PATENT OFFICE.

WILLIAM W. DEAN, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

TELEPHONE SYSTEM.

No. 833,733.

Specification of Letters Patent.

Patented Oct. 23, 1906.

Application filed December 23, 1902. Serial No. 136,333.

*To all whom it may concern:*

Be it known that I, WILLIAM W. DEAN, a citizen of the United States of America, residing at Chicago, in the county of Cook and State of Illinois, have invented certain new and useful Improvements in Telephone Systems, of which the following is a specification.

My invention relates to telephone systems of the common battery type, in which a single electromagnetic device serves the purpose of the plurality of line-signaling and cut-off relay devices of prior systems. In this system I preferably make use of a consequent-pole relay or electromagnetic device for the control of the line-signal. A consequent-pole relay or other electromagnetic device is one in which two opposing windings are so arranged as not to neutralize each other, but so as to allow the lines of force to unite and leave the closed magnetic circuit, and thus attract an armature placed in the proper position to be attracted by the consequent pole thus produced. I preferably arrange this device with a winding in each of the line conductors, one of said windings being of high resistance—say one thousand ohms—and the other winding of low resistance—say one hundred ohms; but the number of turns in both windings are preferably made equal. When a call is made from the substation, the calling-current passes serially through the two windings; but since the turns are the same both windings produce equal fields of force, which instead of neutral-izing each other serve to attract the armature located adjacent the consequent pole. When the call is answered by the operator, provision is made for shunting the high resistance of the consequent-pole device by a low-wound supervisory relay or electromagnetic winding, preferably of one hundred ohms, and the paths of these relays, together with the line resistance, is shunted by another relay or supervisory electromagnetic winding, which is preferably of one thousand ohms resistance. Under these conditions the field of force produced by the one-thousand-ohm winding will be so much less than the field of force produced by the one-hundred-ohm winding that no consequent pole is produced, or, more properly speaking, if formed will be displaced, so that the armature will not be attracted.

In the accompanying drawing the figure represents in diagram a telephone system embodying my improvements.

The same reference characters indicate like parts throughout.

Two subscribers' lines L and L$^2$ extend from their respective substations in two limbs 2 and 3 to the central office. At the substation any suitable apparatus suitable for common battery working or for other working may be provided, that shown consisting of a bell 4 and condenser 5 of ordinary type, preferably in a permanent bridge of the line, and a transmitter 6 and receiver 7 in a normally open bridge adapted to be closed by the switch-hook 8 when the receiver is removed therefrom.

At the central office the line is provided with preferably permanently connected jacks J, J$^2$, and J$^3$ in any suitable number, having their tip and sleeve contacts connected with the corresponding line conductors. Each line is also provided with a consequent-pole relay R, having a closed magnetic circuit, as shown, and a high-resistance coil 9 wound upon one side of said metallic closed magnetic circuit and included in the tip-line conductor, while the low-resistance winding 10 thereof is wound upon the other side of said closed magnetic circuit and is included in the sleeve-conductor 3 of the telephone-line. The consequent pole is formed substantially at the point 11 by the equal and opposite magnetic fields generated in the opposite sides of the closed magnetic circuit by the current flowing serially over the line and through said windings when a subscriber is calling the central office. An armature 12 is arranged to respond to said consequent pole and controls the local circuit of the line-signal S, preferably in the form of a small incandescent lamp. The tip-line conductor is connected with a common limb 13, extending to the live pole of the central and common source of steady current, preferably of the storage-battery type.

Each operator at the central office is provided with a plurality of cord-circuits having each a pair of plugs P and P$^2$, having tip and sleeve contact surfaces adapted to register with the like contact-surfaces of the spring-jacks or connection-terminals of the telephone-lines, and the tip-contacts of which are connected together through the strands $t$ and $t^2$ and the condenser $c$, while the sleeve-contacts of the said plugs are inductively joined by means of the flexible strands $s$ and $s^2$ and the condenser $c^2$. Supervisory relays $r$ and $r^2$ are connected across the answering end of the cord-circuit, relay $r$ being preferably of low resistance, while the relay $r^2$ is of high resistance, and an intermediate point of their bridge is joined by conductor 15 with the live pole of the battery B. The relay $r$ controls, through its normally closed contacts, and the relay $r^2$, through its normally open contacts, the circuit of the supervisory signal $S^2$. A similar pair of relays $r^3$ and $r^4$ are connected in a bridge 16 of the calling end of the cord-circuit, which bridge is joined by a suitable conductor 17 with the live pole of the battery B. These relays control the local circuit of the supervisory lamp $S^3$, associated with the calling-plug $P^2$. The continuity of the tip-strand $t^2$ is controlled through the extra spring 18 of the relay $r^4$ and normally connects the forward portion of said strand through the medium of conductor 19 with a high-resistance and high-impedance test-relay $r^5$, the other pole of which is grounded. The operator's transmitter 20 is located in a grounded conductor 21, containing retardation-coil 22 and leading to the common conductor 13$^a$, connected with the live pole of said battery B. The primary winding of the operator's induction-coil 23 and a condenser $c^3$ are placed in a shunt about the transmitter 20, and the middle point of said shunt is adapted to be grounded by the operation of the said test-relay. The operator's receiver, the secondary of her induction-coil, and a suitable condenser are adapted to be placed in a bridge of the calling end of the cord-circuit by springs 24 of any suitable listening-key. A ringing-generator 25, having one pole grounded, is adapted to be connected with either side of the calling end of the cord-circuit by the operation of springs 26 or 27, the opposite side of the cord-circuit being at the same time grounded.

Taking up the receiver at the station A of the line L permits current to flow from the battery B at the central office over conductor 13, through the coil 9 of the consequent-pole relay R, over the tip-conductor 2, through the substation devices back to the central office over conductor 3 and through the low-resistance winding 10 of said relay to ground. Owing to the equal number of turns of wire upon the two sides of the said relay, the magnetic fields produced are equal and opposite, and a consequent pole is formed at the point 11, which serves to attract the armature 12, thereby closing the local circuit of the line-signal S to indicate the call of the waiting subscriber. In response to the call the operator inserts the answering-plug P, thereby connecting the supervisory relay $r$ in parallel with the winding 9 of the relay R, while the relay $r^2$ is connected in parallel or in shunt of the line resistance, which includes the said relay $r$ and winding 9 in parallel. In other words, the said relay $r^2$ is connected in series with the winding 10 of the relay R. Under the conditions assumed—namely, that the windings 9 and 10 of relay R are respectively one thousand and one hundred ohms resistance and the windings of $r$ and $r^2$ are likewise of one hundred and one thousand ohms resistance—the following condition now exists: The field of force produced by the one-thousand-ohm winding, which is shunted by the one-hundred-ohm winding of $r$ is much less than that produced by the one-hundred-ohm winding 10, through which flows all the current sent to line from the battery B. This results in either preventing the formation of a pole or in so displacing it in the closed magnetic circuit that the armature 12 is freed and drops back to open a circuit of the line-lamp S. The supervisory signal S is not operated, as the relay $r$ serves to open its circuit. Upon learning the subscriber wanted, the calling-plug $P^2$ is employed to test the condition of the said line. If idle, the test-rings of the jacks of the line are connected with the ground or with the grounded pole of the battery, while the tip of the testing-plug is normally likewise connected through the test-relay $r^5$, so that no flow of current results and the busy-click is not received. If the line is busy, however, the test-rings of the jacks are connected, through the sleeve-strand of the cord-circuit, with the live pole of the battery B, and the application of a grounded test-plug results in a flow of current and the actuation of the test-relay, which, as before explained, causes a click in the operator's receiver.

Assuming that the line is found idle, the calling-plug is inserted and the ringing-springs 26 or 27 actuated to call the subscriber D or C, whose bells are grounded from the opposite line conductors. The portion of the ringing-current that escapes through the one winding or the other of the relay R does not operate the same for two reasons—first, because the current is alternating in character and the relay may not readily respond thereto, and, second, because the field of force is closed and does not produce a pole opposite the armature. Should the subscriber respond during ringing, a low-resistance return-path is completed through the opposite grounded key, the latter serving as a return-path during ringing in case the subscriber's bell is connected in the metallic circuit. After ringing and before the response of the subscriber current flows from the battery B over the conductors 17 and 16, through the sleeve-relay $r^4$, and thence over the sleeve-strand $s^2$ and through the winding 10 of the relay R. The relay R does not respond to this current owing to the closed magnetic circuit for the field of force; but the relay R⁴ is actuated and closes the local circuit of the supervisory lamp S³, which is now lighted and completes the tip-line for conversation. During conversation the battery B furnishes current to the substations for transmission purposes and for the operation of the various relays. At the termination of the conversation the subscribers hang up their receivers, thus opening the lines to current thereover, and the same condition prevails with both lines as just explained in connection with the line L² after the calling of the subscriber and before his response—that is, current from the battery B is flowing through both sleeve supervisory relays and through the windings 10 of the relays R, the latter relays refusing to operate owing to their closed metallic circuits, while the former relays remain energized to direct current through the supervisory lamps. Upon noticing these signals the operator withdraws the plugs and restores all parts to normal condition. With the resistances assumed the unbalancing feature of the said line-relays is sufficiently great up to a total line resistance of nearly one thousand ohms to obtain a sufficient and satisfactory operation of the said relays. The electrical dimensions of the other apparatus may be that usually employed or such as may be desired. The several grounds mentioned may be one and the same, or the common office ground or common office return. The substation set shown is intended merely to be typical of any desired substation outfit suitable for the purposes in hand.

Various modifications may be made in the system and apparatus, and I do not, therefore, wish to be limited in all respects and in all claims to those so specifically shown and described.

I claim—

1. In a telephone system, the combination with a telephone-line, of a consequent-pole electromagnetic device for each line, means for operating the same to establish contiguous poles of the same polarity whereby a consequent pole is formed thereon to cause a signal at the central office, and means to prevent the formation of such pole when a connection is established with a line to render the signal inoperative, substantially as described.

2. In a telephone system, the combination with a telephone-line, of a consequent-pole relay for the line, a signal controlled by said relay, means for actuating said relay controlled from the substation to establish a consequent pole thereon between contiguous poles thereof of the same polarity, said consequent pole being adapted to cause a call at the central office, and means for rendering said relay inoperative when a connection is established with the line to retire or prevent the operation of the said signal, substantially as described.

3. In a telephone system, the combination with a telephone-line, a line-signaling device therefor, means controlled from the substation for establishing a consequent pole on said device, and means for shifting said pole upon the establishment of a connection with the line, substantially as described.

4. In a telephone system, the combination with a telephone-line, of an electromagnetic signaling device associated therewith having a closed magnetic circuit, means for establishing a consequent magnetic pole at one portion of said closed magnetic circuit, an armature arranged to be attracted by said pole, and means for rendering said device inoperative to cause it to release the armature or fail to attract the same, substantially as described.

5. In a telephone system, the combination with a telephone-line, of a line-signaling device therefor having a closed magnetic circuit and two windings of different resistances but capable of producing equal and opposite magnetic effects when traversed by current in the line at the time the subscriber is calling the central office, a cord-circuit to establish connections with the line, and means operated when a connection is established by said cord-circuit for causing said windings to produce unlike effects, substantially as described.

6. In a telephone system, the combination with a telephone-line, of a line-signaling device therefor having a closed magnetic circuit and two windings one in each side of the line and in the path of current thereover when the subscriber is calling the central office, means to cause said windings to produce equal and opposite effects when traversed by such calling-currents so as to establish a consequent pole upon said magnetic circuit, an armature to be attracted by said pole and controlling a suitable line-signal, a cord-circuit to establish connections with the line, supervisory apparatus associated therewith, and means for unbalancing the magnetic effects of said windings when the cord-circuit is connected with the line whereby the said pole is shifted or prevented from forming and the said armature is unattracted, substantially as described.

7. In a telephone system, the combination with a signaling device, of a closed magnetic circuit for said device, means to establish a consequent pole at a point on said magnetic circuit to actuate the signal, and means to suitably shift said pole on the magnetic circuit to efface the signal, substantially as described.

8. In a telephone system, the combination with a signal-operating device, of a closed and an open magnetic circuit for said device, electric circuits for the device, and means under one condition of energization of said electric circuit to place two branches of said closed magnetic circuit in parallel and in series with the open magnetic circuit, and under another condition of energization of said electric circuits to place said branches of the closed magnetic circuit in series and in shunt of the open magnetic circuit, and signaling apparatus controlled by the flow of magnetic flux through said open magnetic circuit, substantially as described.

9. In a telephone system, the combination with a signaling device, of a closed and an open magnetic circuit for said device, electric circuits for said device, and means to control the current in said electric circuits so as to either include or exclude said open magnetic circuit in the path of the magnetic flux of the device, and a signal controlled by the flux in said open magnetic circuit, substantially as described.

10. In a telephone system, the combination with a signaling device, of a closed and an open magnetic circuit for said device, means under the control of the subscriber to include said open magnetic circuit in the path of magnetic lines of force in the device, and means under the control of the operator to exclude said open magnetic circuit from the path of the lines of force of the device, of a signal adapted to be displayed when the lines of force of the device pass through the open magnetic circuit and adapted to be effaced when the lines of force pass through the closed magnetic circuit, substantially as described.

Signed by me at Chicago, county of Cook, State of Illinois, this 15th day of December, 1902.

WILLIAM W. DEAN.

Witnesses:
 ROBERT LEWIS AMES,
 GAZELLE BEDER.